No. 803,326. PATENTED OCT. 31, 1905.
J. M. CARPENTER.
VEHICLE WHEEL.
APPLICATION FILED APR. 14, 1905.

WITNESSES:
J. E. Davidson.
C. R. Ferguson.

INVENTOR
James M. Carpenter
BY 
ATTORNEYS

UNITED STATES PATENT OFFICE.

JAMES MARQUIS CARPENTER, OF MILLERSBURG, OHIO.

VEHICLE-WHEEL.

No. 803,326.  Specification of Letters Patent.  Patented Oct. 31, 1905.

Application filed April 14, 1905. Serial No. 255,491.

*To all whom it may concern:*

Be it known that I, JAMES MARQUIS CARPENTER, a citizen of the United States, and a resident of Millersburg, in the county of Holmes and State of Ohio, have invented a new and Improved Vehicle-Wheel, of which the following is a full, clear, and exact description.

This invention relates to improvements in wheels for vehicles, particularly automobiles, the object being to provide a wheel with hard-metal or steel teeth on its periphery to prevent slipping on ice or frozen ground, the parts being so arranged as to not interfere generally with the spring-yielding of the wheel.

Other objects of the invention will appear in the general description.

I will describe a vehicle-wheel embodying my invention and then point out the novel features in the appended claims.

Reference is to be had to the accompanying drawings, forming a part of this specification, in which similar characters of reference indicate corresponding parts in all the figures.

Figure 1:
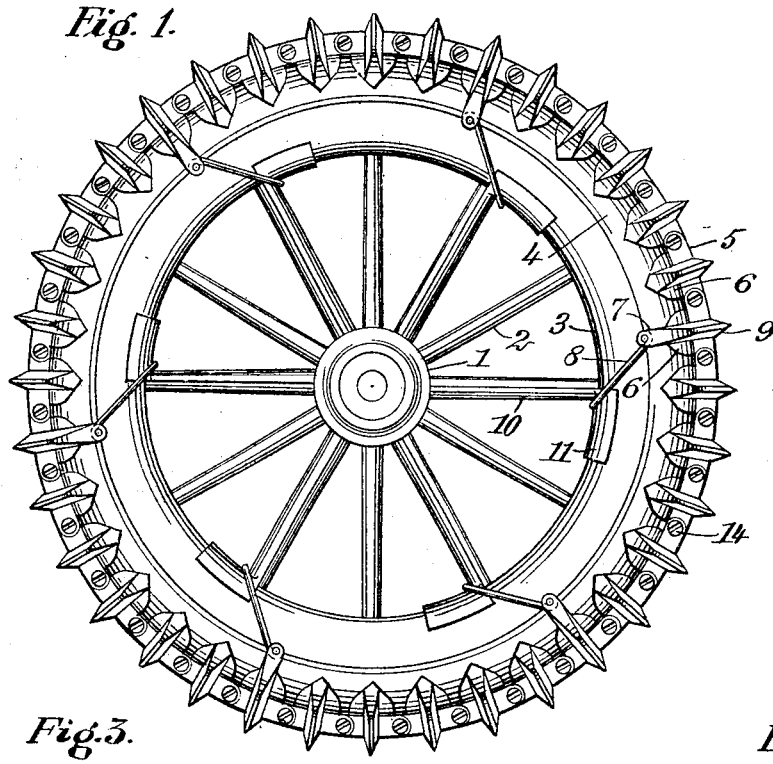
Figure 2:
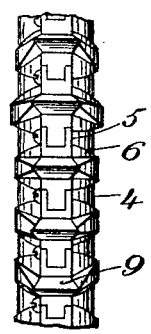
Figure 3:
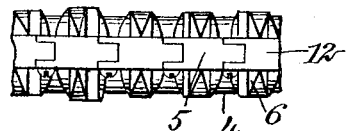
Figure 5:
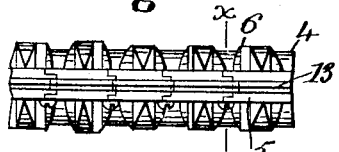
Figure 4:
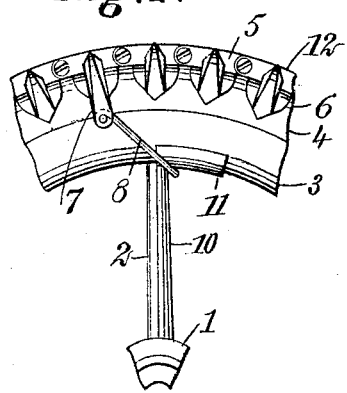
Figure 7:
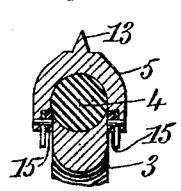
Figure 6:
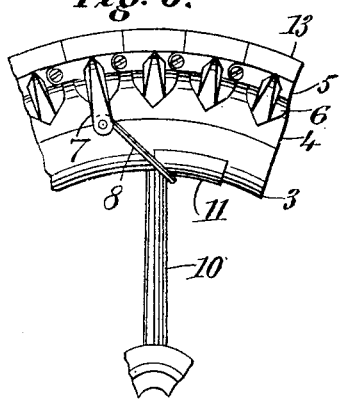
Figure 6:

Figure 1 is a side elevation of a vehicle-wheel embodying my invention. Fig. 2 is a fragmentary peripheral view of the tire. Fig. 3 is a peripheral view showing a modification. Fig. 4 is a side view thereof. Fig. 5 is a fragmentary peripheral view showing another modification. Fig. 6 is a side view thereof, and Fig. 7 is a section on the line $xx$ of Fig. 5.

Referring to the drawings, 1 designates the hub of the wheel, 2 the spokes, and 3 the rim, having the usual peripheral channel for receiving the rubber-tire member 4. The steel tire engages around the rubber-tire member and consists of a plurality of segmental link or pivotally-connected members 5. Each segmental member or link 5 has at its side wing portions 6 for engaging with the sides of the rubber tire 4, and extended from certain of these wings 6 are arms 7, from which clevises or loops 8 pass around the rim 3 of the wheel and engage with the spokes of the wheel. It will be noted in Fig. 1 that the spokes engaged by the clevises are not in direct line with the arms 7. In other words, the clevises 8 are arranged at an angle, so as to prevent the steel tire from slipping around the rubber tire.

Extended transversely over each segmental member 5 is an outwardly-projected tooth 9, which is sharpened, so as to engage in ice, frozen ground, or the like and prevent the wheel from slipping. Where the clevises 8 pass around the rim of the wheel the spokes should be covered with brass, as indicated at 10—that is, covered half-way around and to extend out at the outer end about one inch (1″) on the inner side of the rim, as indicated at 11.

As indicated in Fig. 3, for summer use the tire may be made without employing the teeth 9, in which case the periphery will be smooth, as indicated at 12. The steel tires for the front wheels are practically the same as the tire first described, excepting that the teeth 13 on the several segmental sections extend lengthwise thereof or peripherally of the wheel. By thus forming the blades the vehicle will be prevented from skidding when running fast and making short curves.

To place the tire on a wheel, it is to be brought around the wheel, with the arms 7 on the sides opposite the spokes, and then the clevises are to be passed around the spokes, after which the steel tire is to be drawn around the rubber tire until the clevises 8 assume the position indicated in Fig. 1. It will be noted that the side members of the clevises 8 have pivotal and removal connection with the arms 7. After drawing the steel tire to the position above indicated a suitable clutch or lever is employed for drawing the two free ends of the tire closely together, so that a fastening-bolt 14 may be passed through the same. By making the short sections closely connected together it permits the steel tire to give or yield with the rubber tire.

The side members of the clevises at the point connecting with the arms 7 and at the inner side will be provided with rubber cushions 15, which by engaging the steel rim 3 will prevent rattling of the clevises.

If desired, felt may be placed between the metal and rubber tires to protect the rubber from injury from the metal.

Having thus described my invention, I claim as new and desire to secure by Letters Patent—

1. A vehicle-wheel tire comprising a plurality of short segmental pivotally-connected links, lateral wings on the links or sections, teeth on the links and extended transversely thereof, arms extended inward from certain of said wings, spoke-engaging clevises adapted for removable engagement with said arms, the said clevises being extended at an acute angle to connection with the spokes, and metal plates on the spokes with which the clevises engage.

2. A vehicle-wheel tire comprising a plurality of pivotally-connected links, lateral wings on the links, teeth on the links, arms extended inward from certain of the links, spoke-engaging clevises having removable connection with said links, and cushions between the clevises and the parts on the links with which the clevises connect.

In testimony whereof I have signed my name to this specification in the presence of two subscribing witnesses.

JAMES MARQUIS CARPENTER.

Witnesses:
 JERSEY C. SMITH,
 JOSEPH CARPENTER.